United States Patent
Bragstad et al.

(10) Patent No.: US 9,461,932 B2
(45) Date of Patent: Oct. 4, 2016

(54) VISUALLY DEPICTING RESOURCE UTILIZATION IN A CLOUD COMPUTING ENVIRONMENT

(71) Applicant: International Business Machines Corporation, Armonk, NY (US)

(72) Inventors: Lance Bragstad, Pine Island, MN (US); Bin Cao, Rochester, MN (US); James E. Carey, Rochester, MN (US); Mathew R. Odden, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 284 days.

(21) Appl. No.: 13/956,695

(22) Filed: Aug. 1, 2013

(65) Prior Publication Data

US 2015/0039765 A1   Feb. 5, 2015

(51) Int. Cl.
  *G06F 15/173* (2006.01)
  *H04L 12/911* (2013.01)
  *G06Q 10/06* (2012.01)
  *H04L 12/26* (2006.01)
  *H04L 12/24* (2006.01)

(52) U.S. Cl.
  CPC ............. *H04L 47/70* (2013.01); *G06Q 10/06* (2013.01); *H04L 43/045* (2013.01); *H04L 41/5096* (2013.01); *H04L 43/0876* (2013.01)

(58) Field of Classification Search
  CPC ......... H04L 47/70; H04L 41/00; G06F 8/00; G06F 9/00; G06Q 10/06
  See application file for complete search history.

(56) References Cited

U.S. PATENT DOCUMENTS

| | | | |
|---|---|---|---|
| 7,495,673 B1* | 2/2009 | Srinivasan | G06Q 10/06 345/440 |
| 8,316,305 B2 | 11/2012 | Jaisinghani | |
| 2006/0111874 A1* | 5/2006 | Curtis | G06Q 10/06 702/186 |
| 2007/0121673 A1* | 5/2007 | Hammer | H04L 41/026 370/468 |
| 2011/0029882 A1 | 2/2011 | Jaisinghani | |
| 2012/0166967 A1* | 6/2012 | Deimbacher | G06F 3/048 715/751 |
| 2013/0185433 A1* | 7/2013 | Zhu | H04L 67/303 709/226 |
| 2013/0290536 A1* | 10/2013 | Dutta | G06F 9/5027 709/226 |
| 2015/0106509 A1* | 4/2015 | Lee | H04L 43/0876 709/224 |

OTHER PUBLICATIONS

"Amazon CloudWatch", amazon.com (online), [accessed Aug. 1, 2013], 4 pages, URL: http://aws.amazon.com/cloudwatch/.
Hassan-Montero, et al., "Improving Tag-Clouds as Visual Information Retrieval Interfaces", International Conference on Multidisciplinary Information Sciences and Technologies (InSciT2006), Oct. 25-28, 2006, 6 pages, Mérida, Spain.

\* cited by examiner

*Primary Examiner* — June Sison
(74) *Attorney, Agent, or Firm* — Brandon C. Kennedy; Feb Cabrasawan; Kennedy Lenart Spraggins LLP (57) ABSTRACT

Visually depicting resource utilization in a cloud computing environment, including: identifying a plurality of resources available to a user in the cloud computing environment; identifying resource utilization values for each of the identified resources; assigning each resource to one or more axes of a coordinate system; mapping the resource utilization values for each of the identified resources on the coordinate system; and displaying the resource utilization values for each of the identified resources on the coordinate system.

14 Claims, 7 Drawing Sheets

VISUALLY DEPICTING RESOURCE UTILIZATION IN A CLOUD COMPUTING ENVIRONMENT

BACKGROUND OF THE INVENTION

1. Field of the Invention

The field of the invention is data processing, or, more specifically, methods, apparatus, and products for visually depicting resource utilization in a cloud computing environment.

2. Description of Related Art

The development of the EDVAC computer system of 1948 is often cited as the beginning of the computer era. Since that time, computer systems have evolved into extremely complicated devices. Today's computers are much more sophisticated than early systems such as the EDVAC. Computer systems typically include a combination of hardware and software components, application programs, operating systems, processors, buses, memory, input/output devices, and so on. As advances in semiconductor processing and computer architecture push the performance of the computer higher and higher, more sophisticated computer software has evolved to take advantage of the higher performance of the hardware, resulting in computer systems today that are much more powerful than just a few years ago.

One area of rapid advancement is cloud computing. Cloud computing has become a widely used term to describe the use of computing resources, both hardware and software, that are delivered as a service over a network, typically the Internet. The name comes from the use of a cloud-shaped symbol as an abstraction for the complex infrastructure it contains in system diagrams. Cloud computing entrusts remote services with a user's data, software and computation.

There are many resources available to a user through public cloud computing. In fact, there are thousands of resources that can be entrusted in a cloud computing environment and accessed as a service. Furthermore, different types of resource usage lend themselves to different cost structures and pricing. As the number of resources available in the cloud grows and the cost structure of using these resources becomes more complex, it has become difficult to provide a user friendly interface to illustrate to a user the user's current use of those cloud supported resources.

SUMMARY OF THE INVENTION

Methods, apparatuses, and products for visually depicting resource utilization in a cloud computing environment, including: identifying a plurality of resources available to a user in the cloud computing environment; identifying resource utilization values for each of the identified resources; assigning each resource to one or more axes of a coordinate system; mapping the resource utilization values for each of the identified resources on the coordinate system; and displaying the resource utilization values for each of the identified resources on the coordinate system.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
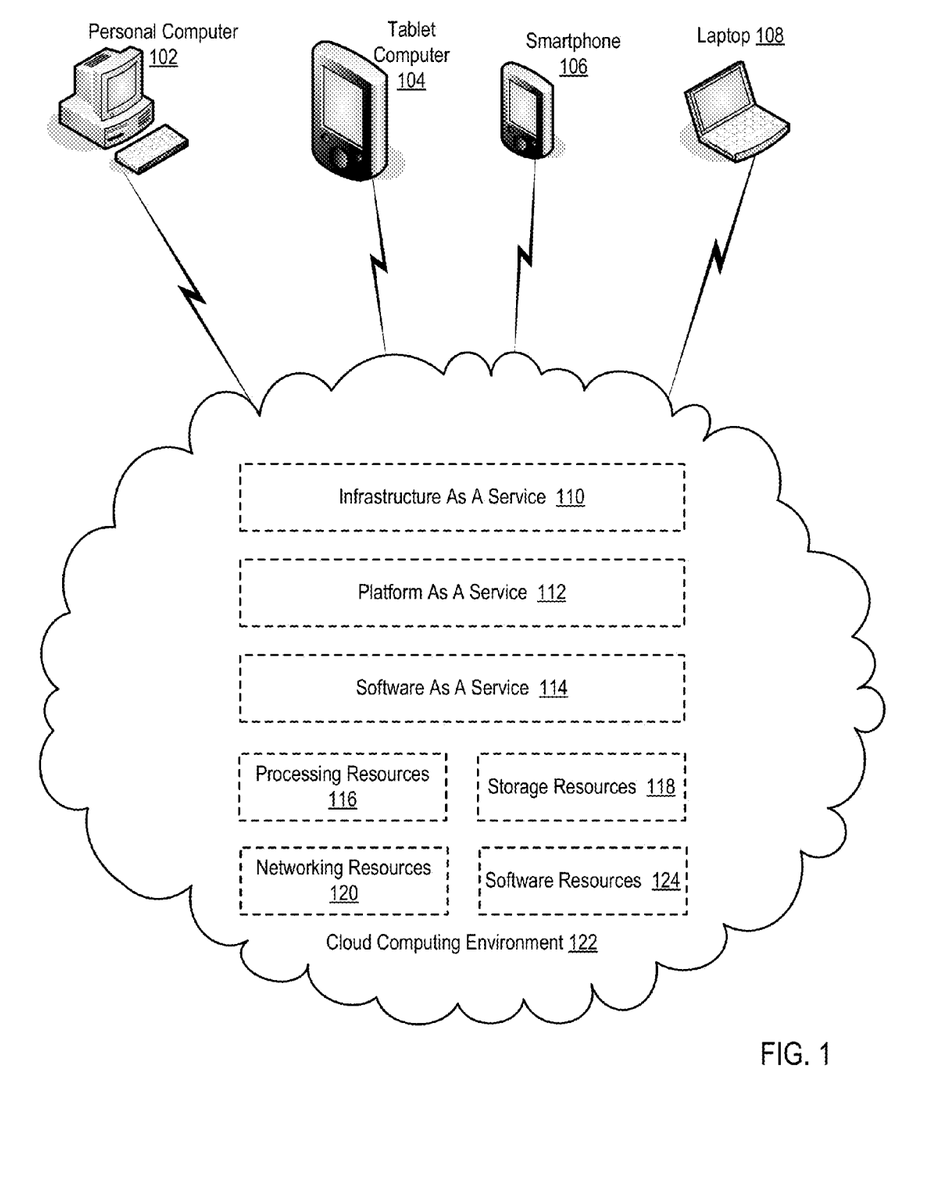
FIG. 1 sets forth a network diagram of a cloud computing environment useful in visually depicting resource utilization in a cloud computing environment according to embodiments of the present invention.

Example methods, apparatus, and products for visually depicting resource utilization in a cloud computing environment in accordance with the present invention are described with reference to the accompanying drawings, beginning with FIG. 1. FIG. 1 sets forth a network diagram of a cloud computing environment (122) useful in visually depicting resource utilization in a cloud computing environment according to embodiments of the present invention. Cloud computing, as the term is used here, represents a model for enabling ubiquitous, convenient, on-demand access to a shared pool of configurable computing resources. Such computing resources can includes data communications networks, computing machinery such as servers, computer storage, software applications, and other resources that that may be rapidly provisioned and released with minimal management effort or interaction from the cloud computing service provider. In the example of FIG. 1, the cloud computing environment (122) can include such a collection of computing resources.

The cloud computing environment (122) of FIG. 1 includes processing resources (116), storage resources (118), networking resources (120), and software resources (124). The processing resources (116) depicted in FIG. 1 represent computer hardware for executing computer program instructions. Such computer hardware can include computer processors and other forms of digital circuit circuitry that may be included in servers, compute nodes, standalone computers, and so on. The storage resources (118) of FIG. 1 represent computer hardware for storing data. Such hardware can includes disk arrays, hard drives, random access memory ('RAM'), and other forms of computer memory that that may be included in servers, compute nodes, standalone computers, and so on. The networking resources (120) depicted in FIG. 1 represent computer hardware for facilitating data communications between various resources inside the cloud computing environment (122) and for facilitating data communications with computing devices that connect to the cloud computing environment (122). Such computer hardware can include network switches, routers, communications adapters that may be included in servers, compute nodes, standalone computers, and so on. The software resources (124) depicted in FIG. 1 represent computer program instructions that may be executed on the processing resources (116), stored on the storage resources (118), and may communicate over the networking resources (120). Such computer program instructions may include operating systems, special purpose software applications, firmware, and so on. Although the processing resources (116), storage resources (118), networking resources (120), and software resources (124) are depicted as being distinct, readers will appreciate that many of these resources may reside within a single computer such as a server. The separation of such resources is only included to identify the various functionalities provided by each resource.

The cloud computing environment (122) of FIG. 1 may utilize the various resources (116, 118, 120, 124) that reside within the cloud computing environment (122) to provide services to users of the cloud computing environment (122). The cloud computing environment (122) can offer such services according to several fundamental models: infrastructure as a service ('IaaS') (110), platform as a service ('PaaS') (112), and software as a service ('SaaS') (114).

IaaS (110) is a service model in which the cloud computing environment (122) offers computers to users of the cloud computing environment (122). Such computers may be embodied as physical computers or virtual machines that are executing on underlying physical resources with the use of a hypervisor. In such an example, pools of hypervisors in the cloud computing environment (122) may offer a large number of virtual machines to users of the cloud computing environment (122). PaaS (112) is a service model in which the cloud computing environment (122) offers computing platforms to users of the cloud computing environment (122). Such computing platforms can include operating systems, databases, web servers, programming language execution environments, and so on. Saas (114) is a service model in which the cloud computing environment (122) offers access to software applications to users of the cloud computing environment (122).

Many types of devices may communicate with the cloud computing environment (122) of FIG. 1 and may take advantage of the services provided by the cloud computing environment (122). In the example of FIG. 1, a personal computer (102), tablet computer (104), smartphone (106), and laptop computer (108) are depicted as being coupled for data communications with the cloud computing environment (122), although readers will appreciate that many other types of computing devices may also be coupled for data communications with the cloud computing environment (122). Such devices may be coupled for data communications with the cloud computing environment (122), for example, over a data communications network such as the Internet, telecommunications networks, wireless networks, and so on.

The arrangement of computing resources and other devices making up the example cloud computing environment (122) illustrated in FIG. 1 are for explanation, not for limitation. Cloud computing environments useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1. Readers will further appreciate that many of the devices illustrated in FIG. 1 may be embodied as virtualized devices. For example, the cloud computing environment (122) may include virtual machines coupled for data communications by virtual routers and other virtualized networking components.

Readers will further appreciate that the example cloud computing environment (122) illustrated in FIG. 1 is simply one example of a cloud computing environment. Cloud computing environments according to embodiments of the present application may take many other forms, and may actually be implemented across multiple clouds. For example, one cloud could have a private IaaS on a single server provider while two different private clouds run AaaS using different implementations of hardware.

Figure 2:
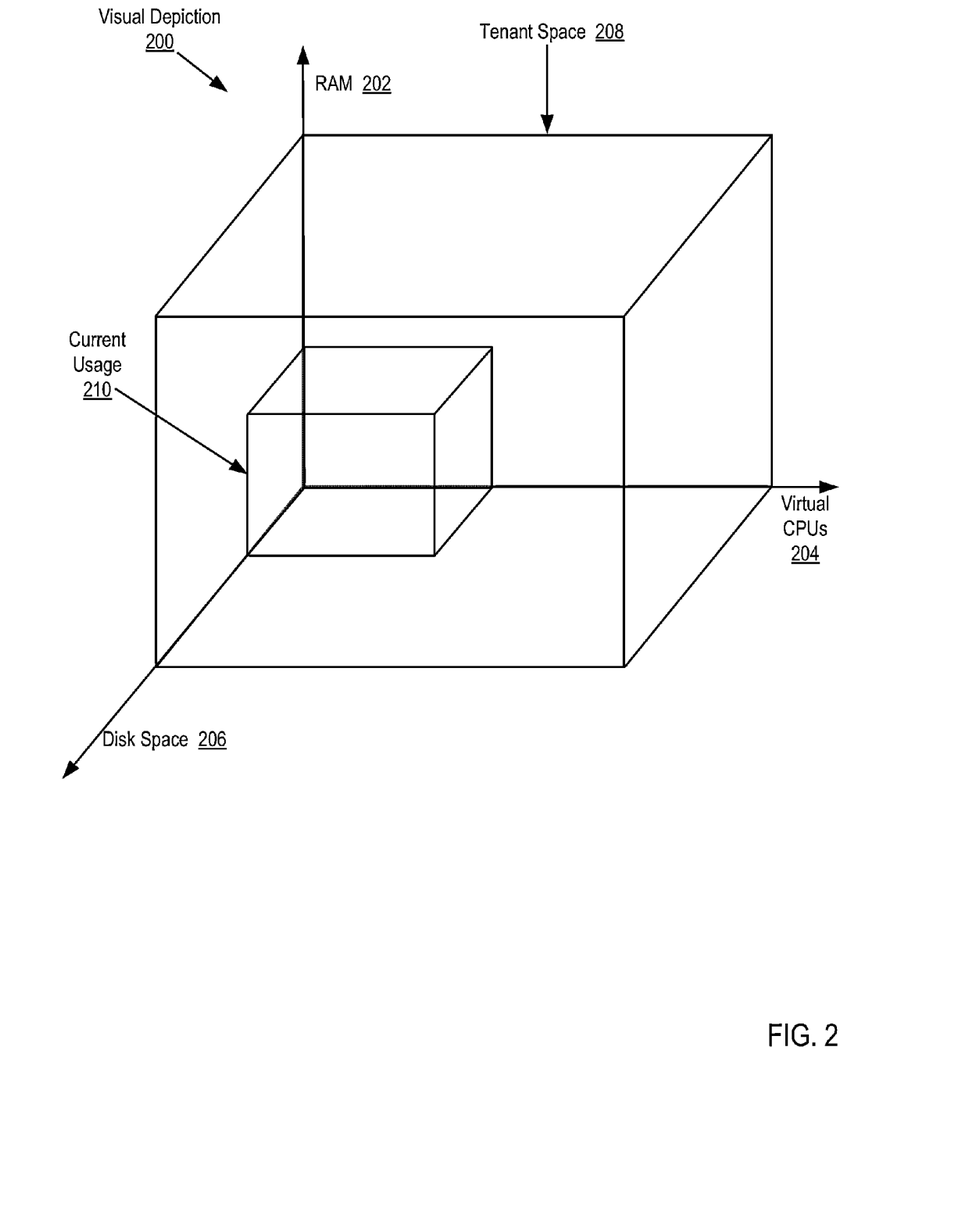
FIG. 2 sets forth an example of a visual depiction of cloud resource utilization in a cloud computing environment according to embodiments of the present invention.

For further explanation, FIG. 2 sets forth an example of a visual depiction (200) of cloud resource utilization in a cloud computing environment according to embodiments of the present invention. The visual depiction (200) of FIG. 2 may be embodied as a graphical representation of the extent to which various resources in a cloud computing environment are being utilized. Such a visual depiction (200) of cloud resource utilization may be rendered, for example, through the use of a graphical user interface displayed on a display device that is accessible to a user, as explained in more detail below.

The visual depiction (200) of FIG. 2 includes three axes, labeled as Virtual CPUs (204), RAM (202), and Disk Space (206). In the example of FIG. 2, the Virtual CPUs (204) axis may be configured to represent the number of virtual central processing units ('CPUs') being utilized. The RAM (202) axis of FIG. 2 may be configured to represent the amount of random access memory ('RAM') being utilized. The Disk Space (206) axis may be configured to represent the amount of disk storage being utilized.

The visual depiction (200) of FIG. 2 includes a graphical element representing a tenant space (208) of the cloud computing environment. In the example of FIG. 2, the tenant space (208) of the cloud computing environment specifies a maximum utilization value for each of the identified resources. In such a way, the tenant space (208) of the cloud computing environment represents the entirety of the mapped computing resources that can be provided by the cloud computing environment. The visual depiction (200) of FIG. 2 also includes a graphical element representing the current usage (210) resources in the cloud computing environment.

Readers will appreciate that although the tenant space (208) and the current usage (210) of FIG. 2 are depicted as being cubes, readers will appreciate that the tenant space (208) and current usage (210) may be depicted using other regular geometrical shapes, irregular shapes, or any combination thereof. Furthermore, each axis may be scaled in a way so as to make the tenant space (208) a regular geometrical shape, so as to make the current usage (210) a regular geometrical shape, or by taking the resultant geometry of the tenant space (208) and the current usage (210) into account so as to attempt to make the geometries of the tenant space (208) and the current usage (210) as regular as possible. Readers will appreciate that the visual depiction (200) of FIG. 2 is for explanation and not for limitation. Visual depictions of cloud resource utilization may take many other forms and may track the usage of many other cloud resources.

Figure 3:
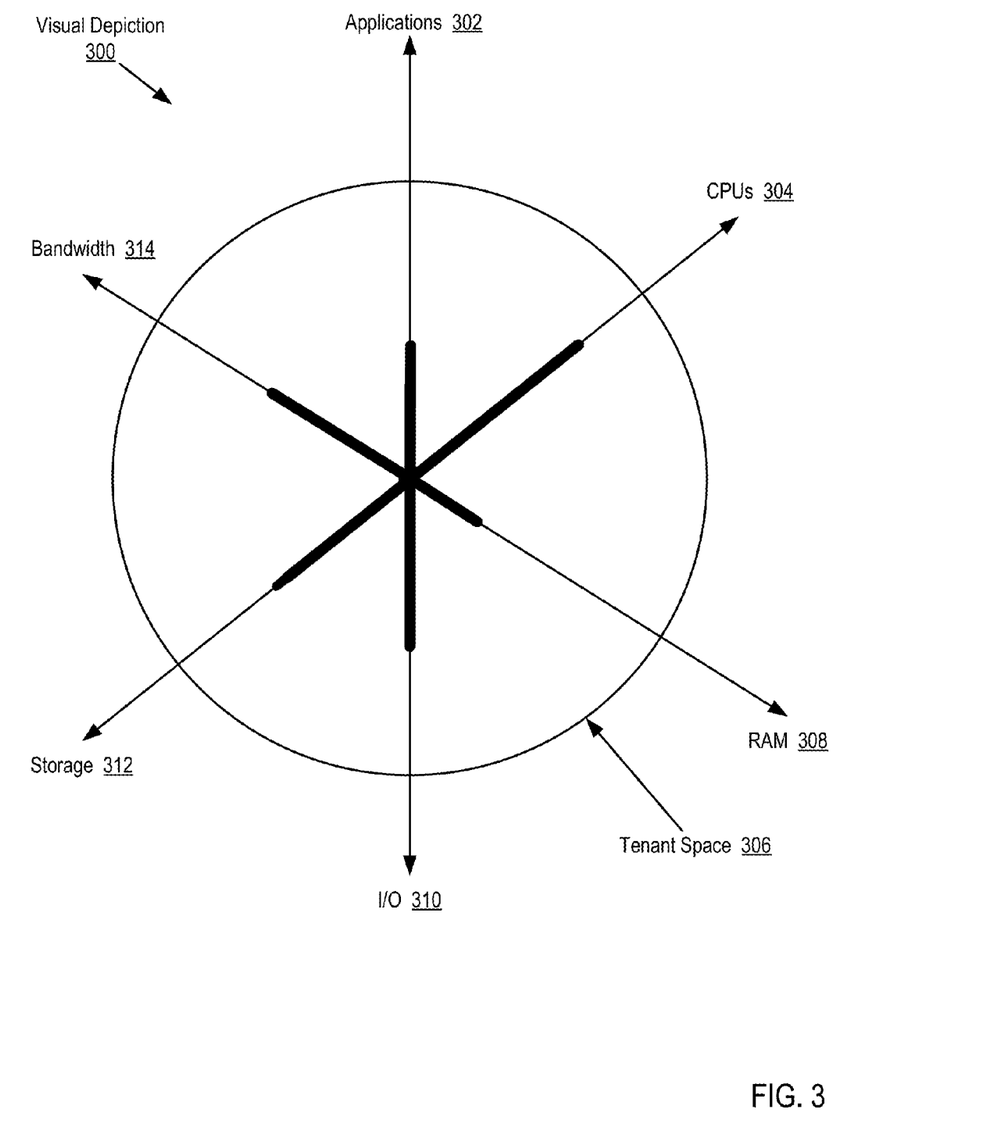
FIG. 3 sets forth an example of a visual depiction of cloud resource utilization according to embodiments of the present invention.

For further explanation, FIG. 3 sets forth an example of a visual depiction (300) of cloud resource utilization according to embodiments of the present invention. The visual depiction (300) of FIG. 3 may be embodied as a graphical representation of the extent to which various resources in a cloud computing environment are being utilized. Such a visual depiction (300) of cloud resource utilization may be rendered, for example, through the use of a graphical user interface displayed on a display device that is accessible to a user, as explained in more detail below.

The visual depiction (300) of FIG. 3 includes six axes, labeled applications (302), CPUs (304), RAM (308), I/O (310), storage (312), and bandwidth (314). In the example of FIG. 3, the applications (302) axis may be configured to represent the number of supporting applications being executed in the SaaS model described above during execution of an application. The CPUs (304) axis may be configured to represent the number of physical central processing units ('CPUs') being utilized during execution of an application and the RAM (308) axis may be configured to represent the amount of random access memory ('RAM') being utilized during execution of an application. The I/O (310) axis may be configured to represent the number of input/output ('I/O') operations being performed per unit of time during execution of an application, the storage (312) axis may be configured to represent the amount of disk storage being utilized during execution of an application, and the bandwidth (314) axis may be configured to represent the amount of network bandwidth utilized during execution of an application. In such an example, the visual depiction of cloud resource utilization includes a darkened line that is superimposed over each axis, indicating the actual amount of usage of the corresponding cloud resource at a given point in time. In such an example, the depicted actual amount of usage of the corresponding cloud resource at a given point in time may correspond to the sum of usage for a particular set of resource consumers, such as a predetermined group of virtual machines.

The visual depiction (300) of FIG. 3 also includes a graphical representation of the tenant space (306) of the cloud computing environment. In the example of FIG. 3, the tenant space (306) of the cloud computing environment specifies a maximum utilization value for each of the identified resources. In such a way, the tenant space (306) of the cloud computing environment represents the entirety of the mapped computing resources that can be provided by the cloud computing environment. By including such a depiction of the tenant space (306), users may better understand the relationship between current resource utilization and resource availability.

Readers will appreciate that although the tenant space (306) of FIG. 3 is depicted as being a sphere, the tenant space (208) may be depicted using other regular geometrical shapes, irregular shapes, or any combination thereof. Furthermore, each axis may be scaled in a way so as to make the tenant space (306) a regular geometrical shape. Readers will further appreciate that the visual depiction (300) of FIG. 3 is for explanation and not for limitation. Visual depictions of cloud resource utilization may take many other forms and may track the usage of many other cloud resources.

Figure 4:
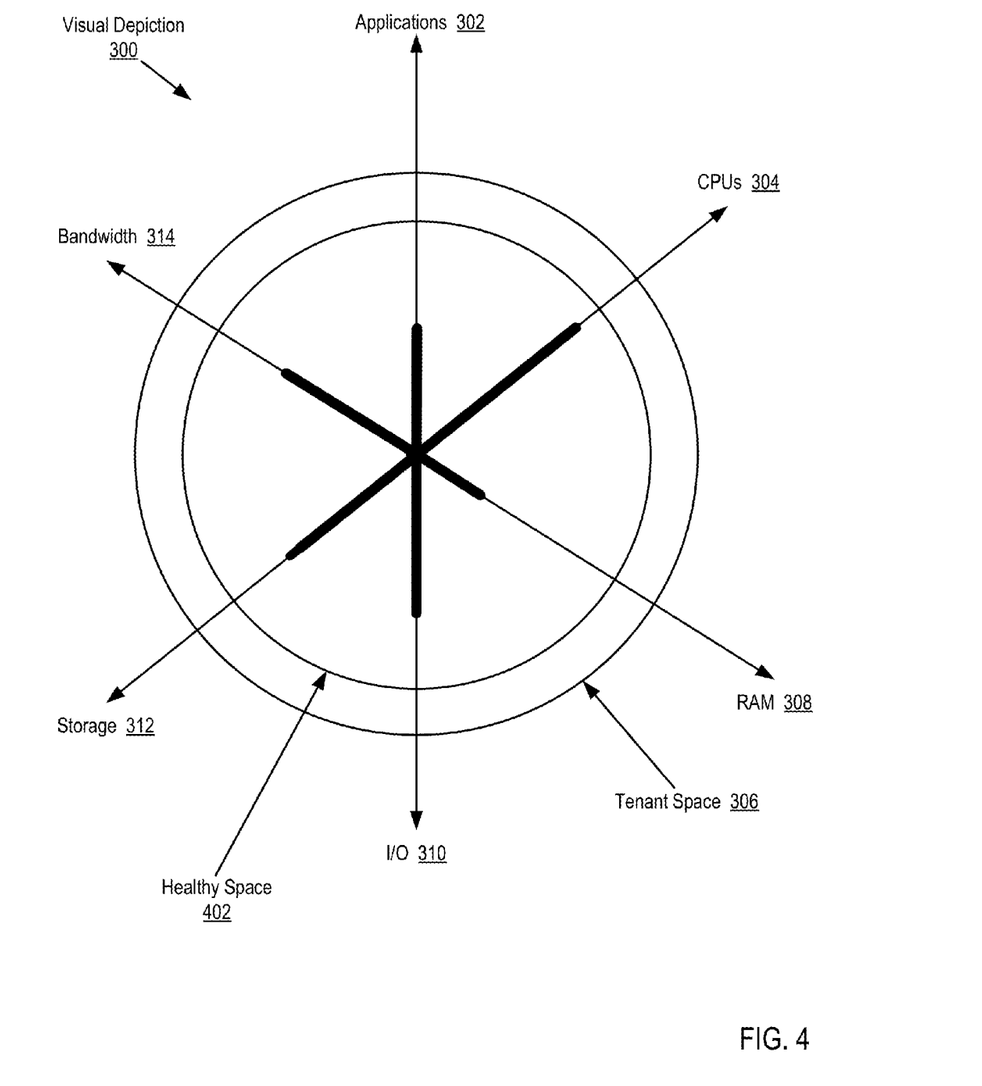
FIG. 4 sets forth an example of a visual depiction of cloud resource utilization according to embodiments of the present invention.

For further explanation, FIG. 4 sets forth an example of a visual depiction (300) of cloud resource utilization according to embodiments of the present invention. The visual depiction (300) of cloud resource utilization is similar to the visual depiction of cloud resource utilization illustrated in FIG. 3. Like the visual depiction of cloud resource utilization in FIG. 3, the visual depiction (300) of cloud resource utilization in FIG. 4 includes six axes, labeled applications (302), CPUs (304), RAM (308), I/O (310), storage (312), and bandwidth (314). Like the visual depiction of cloud resource utilization in FIG. 3, the visual depiction (300) of cloud resource utilization in FIG. 4 also includes a depiction of the tenant space (306) of the cloud computing environment.

The visual depiction (300) of cloud resource utilization of FIG. 4 also includes a visual depiction of a healthy space (402). In the example of FIG. 4, the healthy space (402) of the cloud computing environment specifies a preferred maximum utilization value for each of the identified resources. That is, although additional cloud computing resources are available in the tenant space (306), in order to ensure proper and healthy operation of the cloud computing environment, some resources may be set aside and unavailable for use by a particular user. For example, some resources may be set aside to perform backup operations or other system management tasks. As such, the healthy space (402) of the cloud computing environment represents the extent to which cloud computing resources may be utilized without comprising the health of resources within the cloud computing environment.

Readers will appreciate that although the tenant space (306) and the healthy space (402) of FIG. 4 are depicted using spheres, the tenant space (306) and the healthy space (402) may be depicted using other regular geometrical shapes, irregular shapes, or any combination thereof. Furthermore, each axis may be scaled in a way so as to make the tenant space (306) a regular geometrical shape, scaled in such a way to make the healthy space (402) a regular geometry, or scaled in such a way to make both the tenant space (306) and the healthy space (402) as regular as possible. Readers will further appreciate that the visual depiction (300) of FIG. 4 is for explanation and not for limitation. Visual depictions of cloud resource utilization may take many other forms and may track the usage of many other cloud resources.

Figure 5:
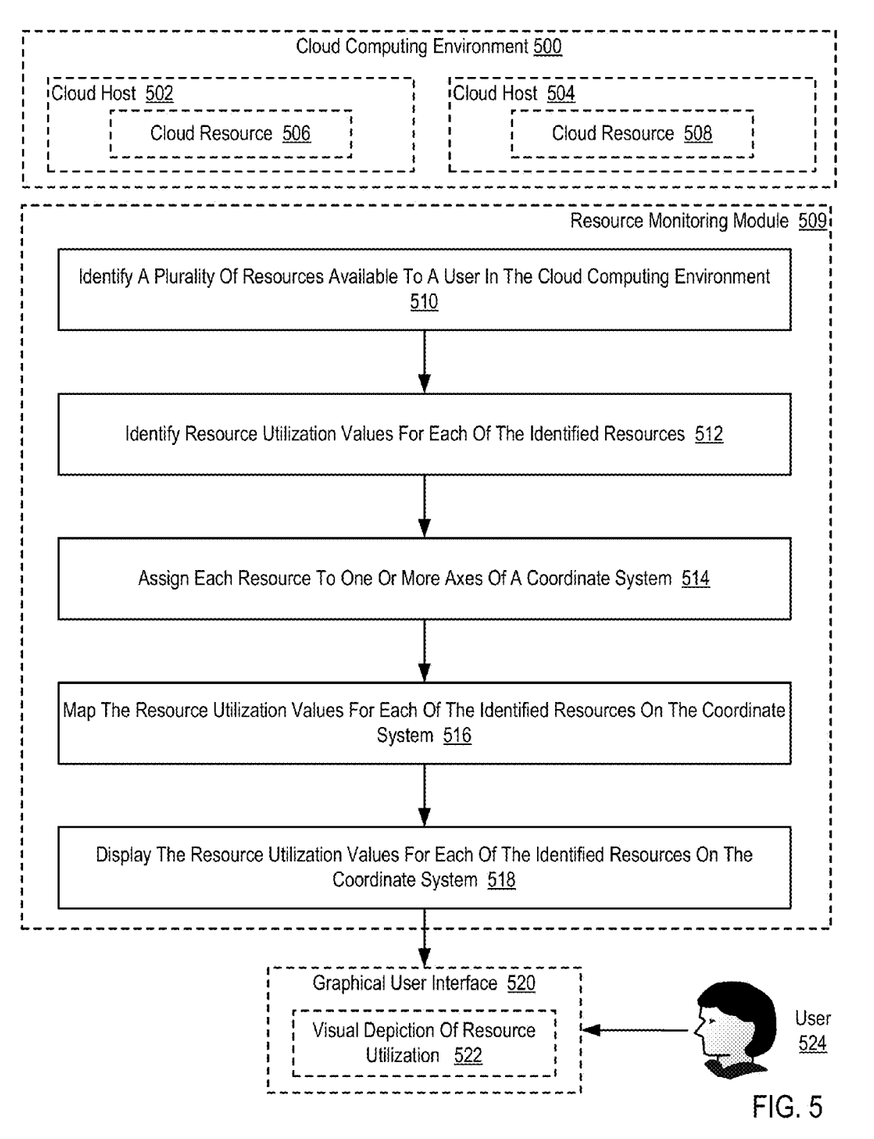
FIG. 5 sets forth a flow chart illustrating an example method for visually depicting resource utilization in a cloud computing environment according to embodiments of the present invention.

For further explanation, FIG. 5 sets forth a flow chart illustrating an example method for visually depicting resource utilization in a cloud computing environment (500) according to embodiments of the present invention. In the example method of FIG. 5, the cloud computing environment (500) may be similar to the cloud computing environment (122) depicted in FIG. 1. The cloud resources (506, 508) of such a cloud computing environment (500) can therefore include various services, virtual resources, physical resources, and other resources such as illustrated in FIG. 1. Likewise, the cloud hosts (502, 504) of such a cloud computing environment (500) can include physical resources such as servers and computers, as well as virtual resources such as virtual machine, and additional resources as depicted and described with respect to FIG. 1.

The example method of FIG. 5 is depicted as being carried out by a resource monitoring module (509). In the example of FIG. 5, the resource monitoring module (509) may be embodied as computer program instructions executing on computer hardware. Readers will appreciate that the resource monitoring module (509) may reside on a single physical machine, on a single virtual machine, or may be distributed across multiple physical machines, multiple virtual machines, or any combination thereof.

The example method of FIG. 5 includes identifying (510) a plurality of resources (506, 508) available to a user (524) in the cloud computing environment (500). In the example method of FIG. 5, a plurality of resources (506, 508) may be identified (510), for example, by a user (524) or other system administrator identifying the available resources, by polling the resources in (506, 508) in the cloud computing environment (500) to determine availability, by examining metadata describing the resources in (506, 508) in the cloud computing environment (500), by directing a request to a cloud resource management module, and in many other ways as will occur to those of skill in the art. Readers will appreciate that although only two resources (506, 508) are depicted in FIG. 5 for ease of explanation, any number of physical and virtual resources may be identified (510) according to embodiments of the present invention.

The example method of FIG. 5 also includes identifying (512) resource utilization values for each of the identified resources (506, 508). In the example method of FIG. 5, the resource utilization value represents the extent to which a particular resource (506, 508) is being utilized. The resource utilization value may be expressed in absolute terms such as, for example, 10 Gb, 300 Mb/s, 20 CPUs, and so on. The resource utilization value may alternatively be express in relative terms such as, for example, 45% of available processor cycles, and so on. In the example method of FIG. 5, identifying (512) resource utilization values for each of the identified resources (506, 508) may be carried out by polling each of the identified resources (506, 508), requesting such information from a cloud management module, and in other ways as will occur to those of skill in the art.

The example method of FIG. 5 also includes assigning (514) each resource (506, 508) to one or more axes of a coordinate system. In the example method of FIG. 5, the coordinate system may be embodied, for example, as a multi-axis graph as illustrated and described above with reference to FIGS. 2-4. Each resource (506, 508) may be assigned to a particular axis, for example, through the use of a graphical user interface (520) that allows the user (524) to associate each resource with a particular axis, through the use of a set of predetermined axis-assignment rules, randomly, or in other ways as will occur to those of skill in the art.

The example method of FIG. 5 also includes mapping (516) the resource utilization values for each of the identified resources (506, 508) on the coordinate system. In the example method of FIG. 5, mapping (516) the resource utilization values for each of the identified resources (506, 508) on the coordinate system may be carried out, for example, by plotting the resource utilization value for a particular identified resource (506) on the axis that has been assigned (514) to the particular identified resource (506). Readers will appreciate that in such an example, the scale for each axis may be adjusted to ensure that resource utilization is depicted using a regular geometry. For example, each axis may be scaled such that the resource utilization value for each of the identified resources (506, 508) is plotted a predetermined number of pixels from the origin of the coordinate system.

The example method of FIG. 5 also includes displaying (518) the resource utilization values for each of the identified resources on the coordinate system. In the example method of FIG. 5, the resource utilization values for each of the identified resources on the coordinate system may be displayed (518) using a graphical user interface (520) that is presented to a user. The resource utilization values for each of the identified resources on the coordinate system may be displayed (518) on the graphical user interface (520) as a visual depiction of resource utilization (522) such as the visual depictions described above with reference to FIG. 2-4.

Figure 6:
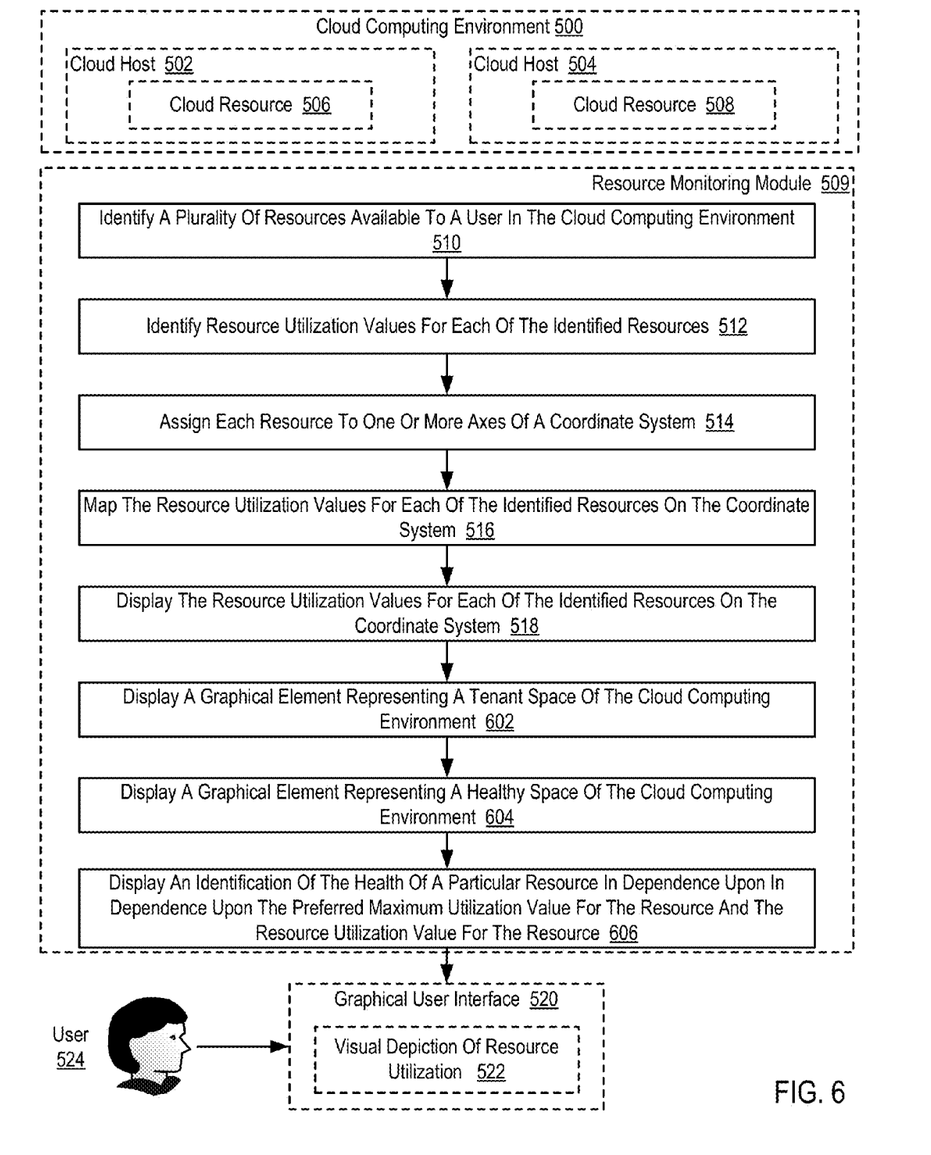
FIG. 6 sets forth a flow chart illustrating an additional example method for visually depicting resource utilization in a cloud computing environment according to embodiments of the present invention.

For further explanation, FIG. 6 sets forth a flow chart illustrating an additional example method for visually depicting resource utilization in a cloud computing environment (500) according to embodiments of the present invention. The example method of FIG. 6 is similar to the example method of FIG. 5, as it also includes identifying (510) a plurality of resources (506, 508) available to a user (524) in the cloud computing environment (500), identifying (512) resource utilization values for each of the identified resources (506, 508), assigning (514) each resource (506, 508) to one or more axes of a coordinate system, mapping (516) the resource utilization values for each of the identified resources (506, 508) on the coordinate system, and displaying (518) the resource utilization values for each of the identified resources on the coordinate system.

The example method of FIG. 6 also includes displaying (602), on the coordinate system, a graphical element representing a tenant space of the cloud computing environment (500). In the example method of FIG. 6, the tenant space of the cloud computing environment (500) can specify a maximum utilization value for each of the identified resources (506, 508). The tenant space of the cloud computing environment (500) may be displayed (602), for example, using a cube, sphere, or other regular or irregular geometry as described above with reference to FIGS. 2-4.

The example method of FIG. 6 also includes displaying (604), on the coordinate system, a graphical element representing a healthy space of the cloud computing environment (500). In the example method of FIG. 6, the healthy space of the cloud computing environment (500) can specify a preferred maximum utilization value for each of the identified resources (506, 508). The healthy space of the cloud computing environment (500) may be displayed (604), for example, using a cube, sphere, or other regular or irregular geometry as described above with reference to FIGS. 2-4.

The example method of FIG. 6 also includes displaying (606) an indication of the health of a particular resource (506) in dependence upon the preferred maximum utilization value for the particular resource (506) and the resource utilization value for the particular resource (506). In the example method of FIG. 6, displaying (606) an indication of the health of a particular resource (506) in dependence upon the preferred maximum utilization value for the particular resource (506) and the resource utilization value for the particular resource (506) may be carried out by determining whether the resource utilization value for the particular resource (506) is less than the preferred maximum utilization value for the particular resource (506). If the resource utilization value for the particular resource (506) is less than the preferred maximum utilization value for the particular resource (506), the particular resource (506) may be deemed to be healthy.

Readers will appreciate that the health of a particular resource (506) may be a relative scale, such that a particular can be healthy, somewhat healthy, unhealthy, or any other designation. In such an example, each designation may be determined based on the relationship between the resource utilization value for the particular resource (506) and the preferred maximum utilization value for the particular resource (506). For example, if the resource utilization value for the particular resource (506) is less than ½ of the preferred maximum utilization value for the particular resource (506), the particular resource (506) may be determined to be very healthy, while the particular resource (506) may only be determined to be somewhat healthy if the resource utilization value for the particular resource (506) is between ½ of the preferred maximum utilization value for the particular resource (506) and the preferred maximum utilization value for the particular resource (506). In such an example, the indication of the health of a particular resource (506) may be identified using color. For example, an unhealthy resource may be designated in red, a somewhat healthy resource may be designated in yellow, and a healthy resource may be designated in green. In the example of FIG. 6, color may also be used indicate the rate of change of the resource utilization. For example, if the utilization of a particular resource (506) exceeds a predetermined threshold, the color red may be applied to the depiction of resource utilization for the particular resource (506).

Visually depicting cloud resource utilization in accordance with the present invention is generally implemented with computers, that is, with automated computing machinery. For further explanation, therefore, FIG. 7 sets forth a block diagram of automated computing machinery comprising an example computer (752) useful in visually depicting cloud resource utilization according to embodiments of the present invention. The computer (752) of FIG. 7 includes at least one computer processor (756) or 'CPU' as well as random access memory (768) ('RAM') which is connected through a high speed memory bus (766) and bus adapter (758) to processor (756) and to other components of the computer (752).

Stored in RAM (768) is a resource monitoring module (509), a module of computer program instructions for visually depicting cloud resource utilization. The cloud computing environment (500) of FIG. 7 may be similar to the cloud computing environment (122) depicted in FIG. 1. The cloud resources (506, 508) of such a cloud computing environment (500) can therefore include the various services and the various resources depicted in FIG. 1. Likewise, the cloud hosts (502, 504) of such a cloud computing environment (500) can include the physical and virtual resources depicted and described with respect to FIG. 1, as well as physical resource, virtual resources such as a plurality of virtual machines, or other resources as will occur to those of skill in the art.

Figure 7:
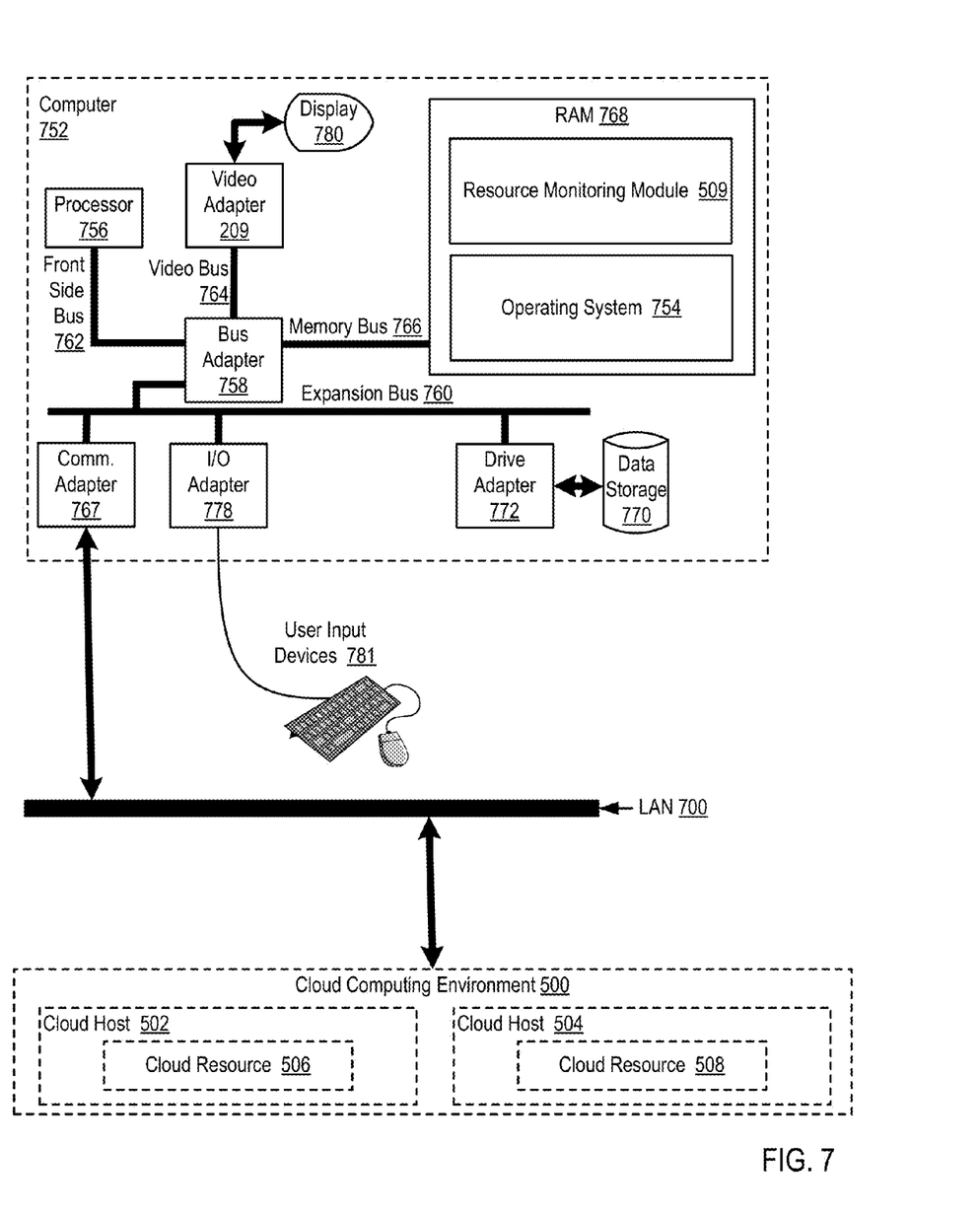
FIG. 7 sets forth a block diagram of automated computing machinery comprising an example computer useful in visually depicting cloud resource utilization according to embodiments of the present invention.

The resource monitoring module (308) of FIG. 7 may be configured to: identify a plurality of resources (506, 508) available to a user in the cloud computing environment (500); identify resource utilization values for each of the identified resources (506, 508); assign each resource (506, 508) to one or more axes of a coordinate system; map the resource utilization values for each of the identified resources (506, 508) on the coordinate system; and display the resource utilization values for each of the identified resources (506, 508) on the coordinate system.

Also stored in RAM (768) is an operating system (754). Operating systems useful visually depicting cloud resource utilization according to embodiments of the present invention include UNIX™ Linux™ Microsoft XP™, AIX™, IBM's i5/OS™ and others as will occur to those of skill in the art. The operating system (754) and the resource monitoring module (509) in the example of FIG. 7 are shown in RAM (768), but many components of such software typically are stored in non-volatile memory also, such as, for example, on a disk drive (770).

The computer (752) of FIG. 7 includes disk drive adapter (772) coupled through expansion bus (760) and bus adapter (758) to processor (756) and other components of the computer (752). Disk drive adapter (772) connects non-volatile data storage to the computer (752) in the form of disk drive (770). Disk drive adapters useful in computers for visually depicting cloud resource utilization according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (752) of FIG. 7 includes one or more input/output ('I/O') adapters (778). I/O adapters implement user-oriented input/output through, for example, software drivers and computer hardware for controlling output to display devices such as computer display screens, as well as user input from user input devices (781) such as keyboards and mice. The example computer (752) of FIG. 7 includes a video adapter (209), which is an example of an I/O adapter specially designed for graphic output to a display device (780) such as a display screen or computer monitor. Video adapter (209) is connected to processor (756) through a high speed video bus (764), bus adapter (758), and the front side bus (762), which is also a high speed bus.

The example computer (752) of FIG. 7 includes a communications adapter (767) for data communications with other computers (782) and for data communications with a data communications network (700). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for visually depicting cloud resource utilization according to embodiments of the present invention include modems for wired dial-up communications, Ethernet (IEEE 802.3) adapters for wired data communications network communications, and 802.11 adapters for wireless data communications network communications.

Example embodiments of the present invention are described largely in the context of a fully functional computer system for visually depicting resource utilization in a cloud computing environment. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware or as hardware are well within the scope of the present invention.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a standalone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of visually depicting resource utilization in a cloud computing environment, the method comprising:
    identifying a plurality of resources available to a user in the cloud computing environment;
    identifying resource utilization values for each of the identified resources;
    assigning each resource to one or more axes of a coordinate system;
    mapping the resource utilization values for each of the identified resources on the coordinate system;

displaying, using a display device of the user, the resource utilization values for each of the identified resources on the coordinate system;

displaying, using the display device of the user, on the coordinate system with the resource utilization values, a graphical element representing a healthy space of the cloud computing environment, wherein the healthy space of the cloud computing environment specifies a preferred maximum utilization value for each of the identified resources; and displaying, using the display device of the user, on the coordinate system, a graphical element representing a tenant space of the cloud computing environment, wherein the tenant space of the cloud computing environment specifies a maximum utilization value for each of the identified resources, and wherein each axis of the tenant space is scaled so as to make the graphical element representing the tenant space a regular geometric shape.

2. The method of claim 1 wherein the one or more resources includes a plurality of virtual machines.

3. The method of claim 1 further comprising displaying an identification of the health of a particular resource in dependence upon the preferred maximum utilization value for the resource and the resource utilization value for the resource.

4. The method of claim 3 wherein the identification of the health of a particular resource is indicated using color.

5. The method of claim 1 wherein color is used to indicate the rate of change of resource utilization.

6. An apparatus for visually depicting resource utilization in a cloud computing environment, the apparatus comprising a computer processor, a computer memory operatively coupled to the computer processor, the computer memory having disposed within it computer program instructions that, when executed by the computer processor, cause the apparatus to carry out the steps of:

identifying a plurality of resources available to a user in the cloud computing environment;

identifying resource utilization values for each of the identified resources;

assigning each resource to one or more axes of a coordinate system;

mapping the resource utilization values for each of the identified resources on the coordinate system;

displaying the resource utilization values for each of the identified resources on the coordinate system; and displaying, on the coordinate system, a graphical element representing a tenant space of the cloud computing environment, wherein the tenant space of the cloud computing environment specifies a maximum utilization value for each of the identified resources, and wherein each axis of the tenant space is scaled so as to make the graphical element representing the tenant space a regular geometric shape.

7. The apparatus of claim 6 wherein the one or more resources includes a plurality of virtual machines.

8. The apparatus of claim 6 further comprising computer program instructions that, when executed by the computer processor, cause the apparatus to carry out the step of displaying an identification of the health of a particular resource in dependence upon the preferred maximum utilization value for the resource and the resource utilization value for the resource.

9. The apparatus of claim 8 wherein the identification of the health of a particular resource is indicated using color.

10. The apparatus of claim 6 wherein color is used to indicate the rate of change of resource utilization.

11. A computer program product for visually depicting resource utilization in a cloud computing environment, the computer program product disposed upon a computer readable storage medium, wherein the computer readable storage medium is not a signal, the computer program product comprising computer program instructions that, when executed, cause a computer to carry out the steps of:

identifying a plurality of resources available to a user in the cloud computing environment;

identifying resource utilization values for each of the identified resources;

assigning each resource to one or more axes of a coordinate system;

mapping the resource utilization values for each of the identified resources on the coordinate system;

displaying the resource utilization values for each of the identified resources on the coordinate system; and displaying, on the coordinate system, a graphical element representing a tenant space of the cloud computing environment, wherein the tenant space of the cloud computing environment specifies a maximum utilization value for each of the identified resources, and wherein each axis of the tenant space is scaled so as to make the graphical element representing the tenant space a regular geometric shape.

12. The computer program product of claim 11 wherein the one or more resources includes a plurality of virtual machines.

13. The computer program product of claim 11 further comprising computer program instructions that, when executed, cause the computer to carry out the step of displaying an identification of the health of a particular resource in dependence upon the preferred maximum utilization value for the resource and the resource utilization value for the resource.

14. The computer program product of claim 13 wherein the identification of the health of a particular resource is indicated using color.

* * * * *